US012651737B2

(12) United States Patent
Lee et al.

(10) Patent No.: US 12,651,737 B2
(45) Date of Patent: Jun. 9, 2026

(54) PRE-LITHIATION METHOD FOR LITHIUM SECONDARY BATTERY ANODE, ANODE INTERMEDIATE, AND LITHIUM SECONDARY BATTERY COMPRISING ANODE

(71) Applicant: LG ENERGY SOLUTION, LTD., Seoul (KR)

(72) Inventors: Ilha Lee, Daejeon (KR); Mun Kyu Joo, Daejeon (KR); Sarah Kim, Daejeon (KR); Seoyoung Jeon, Daejeon (KR); Yohan Kwon, Daejeon (KR); Jonghyun Chae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/682,338

(22) PCT Filed: Feb. 2, 2023

(86) PCT No.: PCT/KR2023/001515
§ 371 (c)(1),
(2) Date: Feb. 8, 2024

(87) PCT Pub. No.: WO2023/153715
PCT Pub. Date: Aug. 17, 2023

(65) Prior Publication Data
US 2025/0006884 A1 Jan. 2, 2025

(30) Foreign Application Priority Data
Feb. 9, 2022 (KR) ........................ 10-2022-0016612

(51) Int. Cl.
*H01M 4/04* (2006.01)
*H01M 4/38* (2006.01)
(Continued)

(52) U.S. Cl.
CPC ....... *H01M 4/0404* (2013.01); *H01M 4/0428* (2013.01); *H01M 4/386* (2013.01);
(Continued)

(58) Field of Classification Search
CPC .... H01M 4/0404; H01M 4/0428; H01M 4/13; H01M 4/134; H01M 4/386; H01M 10/0525; H01M 2004/027
(Continued)

(56) References Cited

U.S. PATENT DOCUMENTS 5,110,696 A * 5/1992 Shokoohi ................ C23C 14/08
29/623.5
7,754,390 B2 7/2010 Takezawa et al.
(Continued)

FOREIGN PATENT DOCUMENTS

CN 113540406 A 10/2021
EP 3 503 266 A1 6/2019
(Continued)

OTHER PUBLICATIONS

Extended European Search Report for European Application No. 23753066.2, dated Jan. 26, 2026.
(Continued)

*Primary Examiner* — Brian K Talbot
(74) *Attorney, Agent, or Firm* — Birch, Stewart, Kolasch & Birch, LLP

(57) ABSTRACT

Disclosed is a pre-lithiation method of a negative electrode for a lithium secondary battery, a negative electrode intermediate, and a lithium secondary battery including a negative electrode.

7 Claims, 3 Drawing Sheets

(51) Int. Cl.
    *H01M 10/0525*     (2010.01)
    *H01M 4/02*     (2006.01)
    *H01M 4/13*     (2010.01)
    *H01M 4/134*     (2010.01)

(52) U.S. Cl.
    CPC .. *H01M 10/0525* (2013.01); *H01M 2004/027*
    (2013.01); *H01M 4/13* (2013.01); *H01M 4/134*
    (2013.01)

(58) Field of Classification Search
    USPC .................................................... 427/58, 115
    See application file for complete search history.

(56) References Cited

U.S. PATENT DOCUMENTS

| | | | | |
|---|---|---|---|---|
| 11,489,154 | B2 * | 11/2022 | Brewer ................ | H01M 4/667 |
| 11,545,659 | B2 * | 1/2023 | Hong ................ | H01M 10/0525 |
| 2019/0237750 | A1 * | 8/2019 | Kim .................... | H01M 4/0435 |
| 2019/0319255 | A1 * | 10/2019 | Youn ................... | H01M 4/0423 |
| 2020/0067085 | A1 * | 2/2020 | Chae .................... | H01M 4/139 |
| 2020/0335769 | A1 * | 10/2020 | Chae .................... | H01M 4/483 |
| 2021/0043940 | A1 * | 2/2021 | Chae ................... | H01M 4/1395 |
| 2021/0057733 | A1 * | 2/2021 | Brewer ................ | H01M 4/587 |
| 2021/0159491 | A1 * | 5/2021 | Chae ..................... | H01M 4/366 |
| 2022/0223847 | A1 * | 7/2022 | Youn ................... | H01M 4/0421 |
| 2024/0213448 | A1 * | 6/2024 | Lee ..................... | H01M 4/0423 |

FOREIGN PATENT DOCUMENTS

| | | | |
|---|---|---|---|
| JP | 10-261438 | A | 9/1998 |
| JP | 10-289708 | A | 10/1998 |
| JP | 2007-273459 | A | 10/2007 |
| JP | 2009-80971 | A | 4/2009 |
| JP | 2013-20974 | A | 1/2013 |
| JP | 5476612 | B2 | 4/2014 |
| JP | 2020-501313 | A | 1/2020 |
| KR | 10-1162794 | B1 | 7/2012 |
| KR | 10-1625602 | B1 | 5/2016 |
| KR | 10-2019-0057966 | A | 5/2019 |
| KR | 10-2019-0075573 | A | 7/2019 |
| KR | 10-2019-0075859 | A | 7/2019 |
| KR | 10-2021-0029459 | A | 3/2021 |

OTHER PUBLICATIONS

Japanese Office Action for Japanese Application No. 2024-508539, dated Mar. 4, 2025, with English translation.
International Search Report for PCT/KR2023/001515 (PCT/ISA/210) mailed on May 12, 2023.

* cited by examiner

[Figure 1]
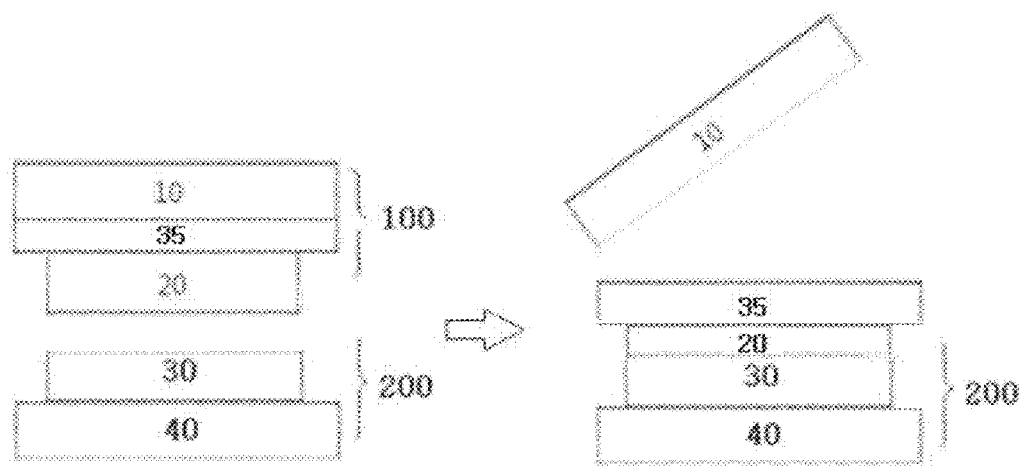
[Figure 2]
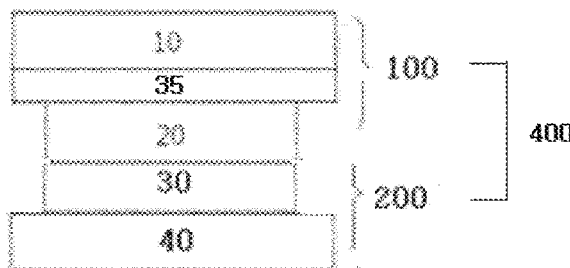
[Figure 3]
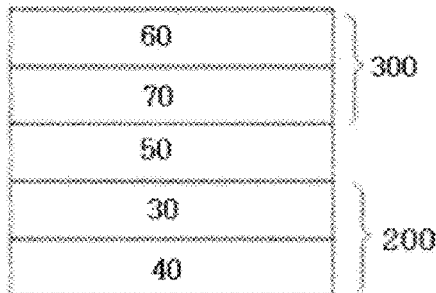

[Figure 4]
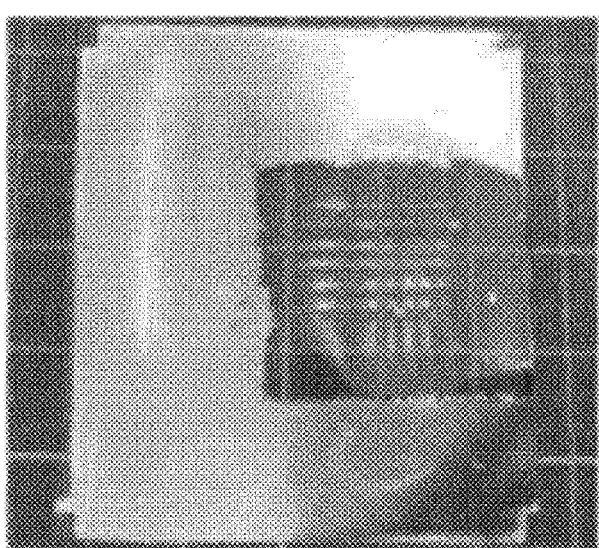
[Figure 5]
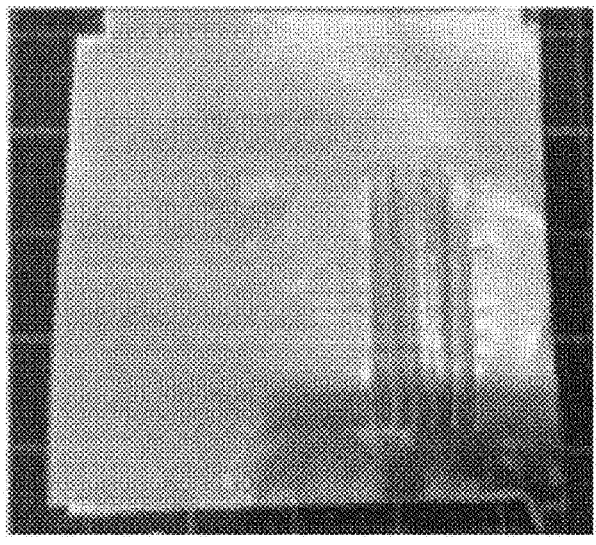

[Figure 6]
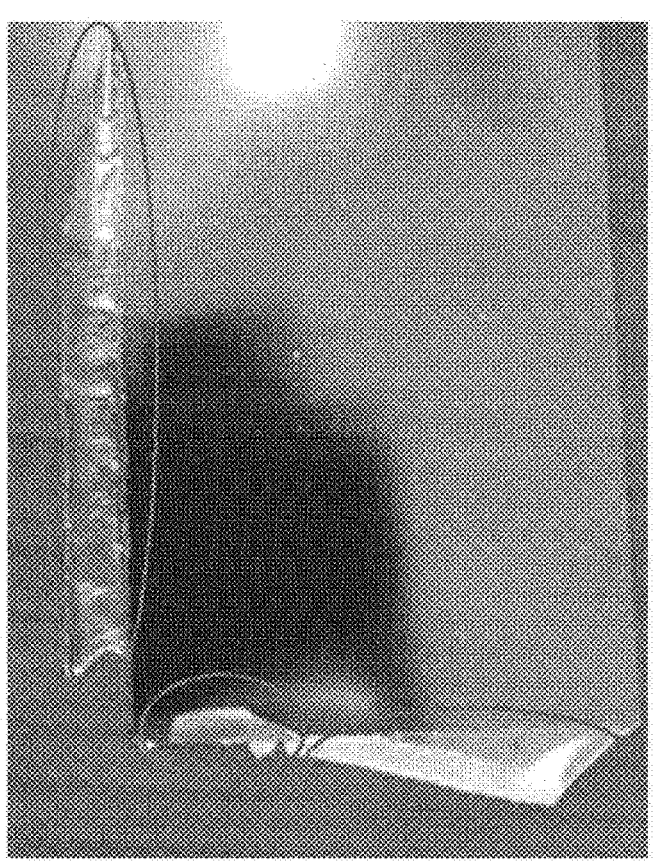
[Figure 7]
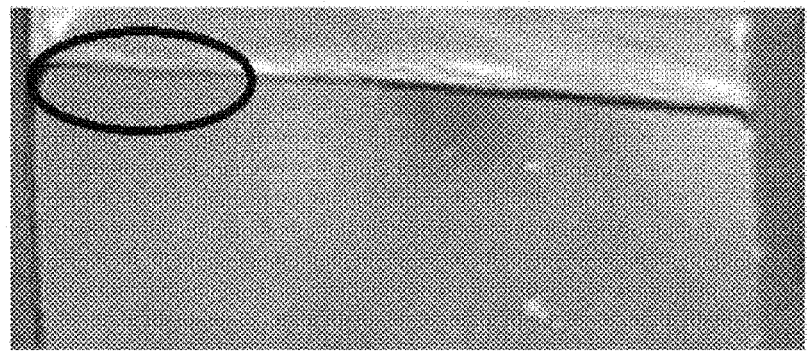

PRE-LITHIATION METHOD FOR LITHIUM SECONDARY BATTERY ANODE, ANODE INTERMEDIATE, AND LITHIUM SECONDARY BATTERY COMPRISING ANODE

TECHNICAL FIELD

The present application claims priority to and the benefit of Korean Patent Application No. 10-2022-0016612 filed in the Korean Intellectual Property Office on Feb. 9, 2022, the entire contents of which are incorporated herein by reference.

The present application relates to a pre-lithiation method of a negative electrode for a lithium secondary battery, a negative electrode intermediate, and a lithium secondary battery including a negative electrode.

BACKGROUND ART

Due to the rapid increase in the use of fossil fuels, the demand for the use of alternative energy or clean energy is increasing, and as part thereof, the fields that are being studied most actively are the fields of power generation and power storage using an electrochemical reaction.

At present, a secondary battery is a representative example of an electrochemical device that utilizes such electrochemical energy, and the range of use thereof tends to be gradually expanding.

Along with the technology development and the increase in demand for mobile devices, the demand for secondary batteries as an energy source is sharply increasing. Among such secondary batteries, lithium secondary batteries having high energy density and voltage, long cycle life, and low self-discharging rate have been commercialized and widely used. In addition, research is being actively conducted on a method for manufacturing a high-density electrode having a higher energy density per unit volume as an electrode for such a high-capacity lithium secondary battery.

In general, a secondary battery includes a positive electrode, a negative electrode, an electrolyte solution, and a separator. The negative electrode includes a negative electrode active material for intercalating and deintercalating lithium ions to and from the positive electrode, and silicon-containing particles having a high discharge capacity may be used as the negative electrode active material.

In general, a carbon material such as graphite is used for a negative electrode of a lithium secondary battery, but the theoretical capacity density of carbon is 372 mAh/g (833 mAh/cm$^3$). Therefore, in order to improve the energy density of the negative electrode, silicon (Si), tin (Sn), and oxides and alloys thereof, which are alloyed with lithium, are considered as negative electrode materials. Among them, silicon-containing materials have attracted attention due to their low cost and high capacity (4200 mAh/g).

However, when a silicon-containing negative electrode active material is used, a problem arises in that the initial irreversible capacity is large. That is, in the charging and discharging reaction of the lithium secondary battery, lithium discharged from the positive electrode is intercalated into the negative electrode during charging, and is deintercalated from the negative electrode to return to the positive electrode again during discharging. In the case of the silicon-containing negative electrode active material, the volume change and the surface side reaction are severe, so that a large amount of lithium intercalated in the negative electrode during initial charging does not return to the positive electrode again, and thus an initial irreversible capacity increases. When the initial irreversible capacity increases, there occurs a problem that the battery capacity and the cycle are rapidly reduced.

In order to solve the above problem, known is a pre-lithiation method of a silicon negative electrode including a silicon-containing negative electrode active material. As the pre-lithiation method, known methods include a method of manufacturing an electrode after lithiation by a physico-chemical method such as electrolytic plating, lithium metal transfer, and lithium metal deposition, a method of electro-chemically pre-lithiating a negative electrode, and the like.

In particular, a transfer method of lithium metal during the pre-lithiation process is considered, and research on a method of safely and easily transferring lithium metal during a process is in progress. The transfer process of lithium metal is carried out according to a Roll-to-Roll (R2R) lamination process, and when the mass production process of the negative electrode is applied, the negative electrode is manufactured in a wide width and cut and used according to the uses.

In this case, in the case of an electrode in which lithium metal is not transferred on top of the negative electrode active material layer, the electrode can be easily cut and used in a desired capacity and size. However, in the case of a negative electrode having lithium metal transferred on the top thereof, if a cutting process is performed according to the desired capacity, an explosion or fire occurs due to the reactivity of lithium metal, or defects are generated in the negative electrode due to non-uniform surface pre-lithiation.

In order to solve the above problems, a method of depositing patterned lithium metal on top of a base layer through masking during the transfer process in the pre-lithiation process, a method of separately depositing small-sized lithium metal, and the like are considered. However, these methods still have problems in that the manufacturing process is complicated and a thickness of an edge portion to be deposited becomes non-uniform.

Therefore, there is a need for research on a transfer process of lithium metal capable of dividing and patterning lithium metal according to a capacity, and a process and a material capable of uniformly pre-lithiating lithium in a negative electrode active material layer in a more safe and efficient manner, in a pre-lithiation process of a negative electrode formed in a wide size for mass production.

CITATION LIST (Patent Literature 1) Japanese Patent Application Publication No. 2009-080971

DETAILED DESCRIPTION OF THE INVENTION

Technical Problem

For mass production of a negative electrode, it is inevitable to manufacture the negative electrode in a wide size and to proceed with an R2R process. However, the above-described problems have occurred, and accordingly, research was conducted on a transfer process of lithium metal capable of dividing and patterning lithium metal according to a capacity in a pre-lithiation process of a negative electrode formed in a wide size, and as a result, it has been found that lithium metal can be divided and transferred into desired sizes through pretreatment of a transfer laminate, during the transfer process.

Accordingly, one aspect of the present application is to provide a pre-lithiation method of a negative electrode for a lithium secondary battery, a negative electrode intermediate, and a lithium secondary battery including a negative electrode.

Technical Solution

An exemplary embodiment of the present specification provides a pre-lithiation method of a negative electrode for a lithium secondary battery, the pre-lithiation method including: forming a negative electrode active material layer on one surface or both surfaces of a negative electrode current collector layer; and transferring lithium metal onto the negative electrode active material layer, in which the transferring of the lithium metal includes pretreating one surface of a base layer in a form of a pattern, forming a transfer laminate by sequentially laminating a release layer and a lithium metal on top of the pretreated one surface of the base layer, laminating the transfer laminate on the negative electrode active material layer such that a surface of the lithium metal opposite to a surface in contact with the release layer comes into contact with a surface of the negative electrode active material layer opposite to a surface in contact with the negative electrode current collector layer, and removing the base layer, and in which the lithium metal and the negative electrode active material layer satisfy Equation 1 below, $$X \leq X1 \qquad \text{[Equation 1]}$$

in Equation 1,

X refers to a width of the lithium metal, and

X1 refers to a width of the negative electrode active material layer.

Another exemplary embodiment provides a negative electrode intermediate including: a negative electrode current collector layer; a negative electrode active material layer formed on one surface or both surfaces of the negative electrode current collector layer; and a transfer laminate formed on a surface of the negative electrode active material layer opposite to a surface in contact with the negative electrode current collector layer, in which the transfer laminate has a structure in which a base layer, a release layer, and a lithium metal are sequentially laminated, in which one surface of the base layer in contact with the release layer includes a pattern-shaped pretreated part, and in which the lithium metal and the negative electrode active material layer satisfy Equation 1 above.

Still another exemplary embodiment of the present application provides a lithium secondary battery including: a positive electrode for the lithium secondary battery; a negative electrode for the lithium secondary battery pre-lithiated according to the method of the present application; a separator between the positive electrode and the negative electrode; and an electrolyte solution.

Advantageous Effects

In general, when proceeding with negative electrode wide coating and lithium metal deposition for mass production, it is necessary to pattern a region of the lithium metal due to the problems described above. Currently, lithium metal can be deposited only on the patterned region. However, the introduction of a masking pattern in the lithium metal deposition process causes non-uniformity in the thickness near an edge of the lithium metal. However, in the pre-lithiation method of a negative electrode for a lithium secondary battery according to the present invention, the surface of the base layer in contact with the release layer is pretreated in a form of a pattern (corona or plasma treatment), so that the transferability of the base layer can be controlled. As a result, the releasing force of the surface subjected to the corona or plasma treatment in a form of a pattern is lowered, so that the lithium metal can be patterned and transferred into a desired shape.

That is, when the base layer is pretreated in a desired pattern as described above, the adhesive force between the pretreated surface and the release layer is increased, resulting in removing the release layer and the lithium metal together upon removal of the base layer. Therefore, it is possible to transfer the lithium metal on top of the negative electrode active material layer, with desired capacity and size.

Further, according to the pre-lithiation method of a negative electrode for a lithium secondary battery according to the exemplary embodiment of the present invention, the transfer process of lithium metal is used, and specifically the range of Equation 1 is satisfied, i.e., the width of the transferred lithium metal is smaller than the width of the release layer transferred together, so that the base layer of the transfer laminate can be easily removed in the transferring of the lithium metal. That is, the problems relating to transferability, such as reverse transfer in the transfer process of lithium metal of the related art, are addressed by adjusting the physical widths, as described above.

In addition, the width of the transferred lithium metal is smaller than the width of the release layer transferred together, and the release layer is transferred to the negative electrode together to prevent exposure of the highly reactive lithium metal to the atmosphere, resulting in functioning as both an atmospheric barrier and a protective layer.

BRIEF DESCRIPTION OF DRAWINGS

FIG. 1 shows a process of transferring lithium metal to a negative electrode for a lithium secondary battery according to an exemplary embodiment of the present application.

FIG. 2 shows a negative electrode intermediate according to an exemplary embodiment of the present application.

FIG. 3 shows a laminated structure of a lithium secondary battery according to an exemplary embodiment of the present application.

FIG. 4 shows a transfer laminate according to Example 1 of the present application.

FIG. 5 shows a transfer laminate according to Comparative Example 1.

FIG. 6 shows a transfer result of lithium metal on top of a negative electrode according to Comparative Example 3 of the present application.

FIG. 7 shows a transfer result of lithium metal on top of a negative electrode according to Example 1 of the present application.

EXPLANATION OF REFERENCE NUMERALS AND SYMBOLS

10: base layer
20: lithium metal
30: negative electrode active material layer
35: release layer
40: negative electrode current collector layer 50: separator
60: positive electrode current collector layer
70: positive electrode active material layer
100: transfer laminate
200: negative electrode for lithium secondary battery
300: positive electrode for lithium secondary Battery
400: negative electrode intermediate

BEST MODE

Before describing the present invention, some terms are first defined.

When one part "includes", "comprises" or "has" one constituent element in the present specification, unless otherwise specifically described, this does not mean that another constituent element is excluded, but means that another constituent element may be further included.

In the present specification, 'p to q' means a range of 'p or more and q or less'.

In this specification, the "specific surface area" is measured by the BET method, and specifically, is calculated from a nitrogen gas adsorption amount at a liquid nitrogen temperature (77K) by using BELSORP-mino II available from BEL Japan, Inc. That is, in the present application, the BET specific surface area may refer to the specific surface area measured by the above measurement method.

In the present specification, "Dn" refers to a particle diameter distribution, and refers to a particle diameter at the n % point in the cumulative distribution of the number of particles according to the particle diameter. That is, D50 is a particle diameter (average particle diameter, center particle diameter) at the 50% point in the cumulative distribution of the number of particles according to the particle diameter, D90 is a particle diameter at the 90% point in the cumulative distribution of the number of particles according to the particle diameter, and D10 is a particle diameter at the 10% point in the cumulative distribution of the number of particles according to the particle diameter. Meanwhile, the particle diameter distribution may be measured using a laser diffraction method. Specifically, after powder to be measured is dispersed in a dispersion medium, the resultant dispersion is introduced into a commercially available laser diffraction particle size measurement apparatus (for example, Microtrac S3500) in which a difference in diffraction patterns according to the particle size is measured, when a laser beam passes through particles, and then a particle diameter distribution is calculated.

In the present specification, the description "a polymer includes a certain monomer as a monomer unit" means that the monomer participates in a polymerization reaction and is included as a repeating unit in the polymer. In the present specification, when a polymer includes a monomer, this is interpreted as the same as that the polymer includes a monomer as a monomer unit.

In the present specification, it is understood that the term 'polymer' is used in a broad sense including a copolymer unless otherwise specified as 'a homopolymer'.

In the present specification, a weight-average molecular weight (Mw) and a number-average molecular weight (Mn) are polystyrene converted molecular weights measured by gel permeation chromatography (GPC) while employing, as a standard material, a monodispersed polystyrene polymer (standard sample) having various degrees of polymerization commercially available for measuring a molecular weight. In the present specification, a molecular weight refers to a weight-average molecular weight unless particularly described otherwise.

Hereinafter, exemplary embodiments of the present invention will be described in detail with reference to the drawings so that one skilled in the art can readily implement the present invention. However, the present invention may be embodied in various different forms, and is not limited to the following descriptions.

An exemplary embodiment of the present specification provides a pre-lithiation method of a negative electrode for a lithium secondary battery, the pre-lithiation method including: forming a negative electrode active material layer on one surface or both surfaces of a negative electrode current collector layer; and transferring lithium metal onto the negative electrode active material layer, in which the transferring of the lithium metal includes pretreating one surface of a base layer in a form of a pattern, forming a transfer laminate by sequentially laminating a release layer and a lithium metal on top of the pretreated one surface of the base layer, laminating the transfer laminate on the negative electrode active material layer such that a surface of the lithium metal opposite to a surface in contact with the release layer comes into contact with a surface of the negative electrode active material layer opposite to a surface in contact with the negative electrode current collector layer, and removing the base layer, and in which the lithium metal and the negative electrode active material layer satisfy Equation 1 below, $$X \leq X1 \qquad \text{[Equation 1]}$$

in Equation 1,
X refers to a width of the lithium metal, and
X1 refers to a width of the negative electrode active material layer.

FIG. 1 shows a process of transferring lithium metal to a negative electrode for a lithium secondary battery according to an exemplary embodiment of the present application. Specifically, processes of laminating a transfer laminate 100, in which a base layer 10, a release layer 35 and a lithium metal 20 are sequentially laminated, onto a negative electrode 200 for a lithium secondary battery formed by a negative electrode current collector layer 40 and a negative electrode active material layer 30, and then removing the base layer 10 of the transfer laminate 100 can be seen.

In this case, after pretreating one surface of the base layer 10 in a form of a pattern, the release layer 35 and the lithium metal 20 are formed, and accordingly, the releasing force of the surface of the base layer 10 subjected to corona or plasma treatment in the form of a pattern is lowered, so that the lithium metal can be patterned and transferred into a desired shape.

In addition, the pre-lithiation method of a negative electrode for a lithium secondary battery according to the present application satisfies the range of Equation 1, and therefore, has excellent characteristics in terms of stability of the transfer process of lithium metal. That is, if the range of Equation 1 is not satisfied, after lithium metal is transferred, lithium metal in a region larger than the negative electrode active material layer comes off together and adheres to the negative electrode active material layer, and a lithium residue separates and remains in a form of particles in an assembly process, which is a post-process, causing great danger in terms of stability.

Below, specific details of the pre-lithiation method of a negative electrode for a lithium secondary battery of the present invention will be described.

The pre-lithiation method of a negative electrode for a lithium secondary battery according to an exemplary embodiment of the present application may include a step of forming a negative electrode active material layer on one surface or both surfaces of a negative electrode current collector layer.

In an exemplary embodiment of the present application, the negative electrode current collector layer generally has a thickness of 1 μm to 100 μm. The negative electrode current collector layer is not particularly limited as long as it has high conductivity without causing a chemical change in the battery. For example, copper, stainless steel, aluminum, nickel, titanium, fired carbon, copper or stainless steel each surface-treated with carbon, nickel, titanium, silver, or the like, an aluminum-cadmium alloy, or the like may be used. In addition, the negative electrode current collector layer may have microscopic irregularities formed on a surface to enhance a coupling force of the negative electrode active material, and may be used in various forms such as a film, a sheet, a foil, a net, a porous body, a foamed body, or a non-woven fabric body.

In this case, a width of the negative electrode current collector layer according to an exemplary embodiment of the present application may be greater than or equal to a width of the negative electrode active material layer.

In an exemplary embodiment of the present application, the negative electrode current collector layer may have a thickness of 1 μm or greater and 100 μm or less, and the negative electrode active material layer may have a thickness of 20 μm or greater and 500 μm or less.

However, the thicknesses may be variously modified depending on a type and use of the negative electrode used, and are not limited thereto.

The manufacturing method of a negative electrode for a lithium secondary battery according to an exemplary embodiment of the present application includes a step of forming a negative electrode for a lithium secondary battery by forming a negative electrode active material layer on one surface or both surfaces of a negative electrode current collector layer.

In an exemplary embodiment of the present application, there is provided the pre-lithiation method of a negative electrode for a lithium secondary battery in which the step of forming the negative electrode active material layer on one surface or both surfaces of the negative electrode current collector layer includes a step of coating a negative electrode slurry including a negative electrode active material layer composition on one surface or both surfaces of the negative electrode current collector layer, and in which the negative electrode active material layer composition includes one or more selected from the group consisting of a silicon-containing active material, a negative electrode conductive material, and a negative electrode binder.

In an exemplary embodiment of the present application, the negative electrode slurry may include a negative electrode active material layer composition, and a slurry solvent.

In an exemplary embodiment of the present application, a solid content of the negative electrode slurry may satisfy a range of 5% or more and 40% or less.

In another exemplary embodiment, the solid content of the negative electrode slurry may satisfy a range of 5% or more and 40% or less, preferably 7% or more and 35% or less, and more preferably 10% or more and 30% or less.

The solid content of the negative electrode slurry may refer to a content of the negative electrode active material layer composition included in the negative electrode slurry, and may refer to a content of the negative electrode active material composition on the basis of 100 parts by weight of the negative electrode slurry.

When the solid content of the negative electrode slurry satisfies the above range, the viscosity is appropriate during formation of the negative electrode active material layer, so that particle aggregation of the negative electrode active material layer composition is minimized to efficiently form the negative electrode active material layer.

In an exemplary embodiment of the present application, the slurry solvent is not limited thereto as long as it can dissolve the negative electrode active material layer composition, but specifically, acetone, distilled water or NMP may be used.

A negative electrode according to an exemplary embodiment of the present application may be formed by coating and drying the negative electrode slurry on the negative electrode current collector layer.

Through the drying step, the slurry solvent in the negative electrode slurry may be dried, and then an electrode roll-pressing step may be further included.

In an exemplary embodiment of the present application, the negative electrode active material layer composition may include one or more selected from the group consisting of a silicon-containing active material, a negative electrode conductive material, and a negative electrode binder.

In an exemplary embodiment of the present application, the silicon-containing active material may include one or more selected from the group consisting of SiOx (x=0), SiOx (0<x<2), SiC, and a Si alloy.

In an exemplary embodiment of the present application, the silicon-containing active material may include one or more selected from the group consisting of SiOx (x=0) and SiOx (0<x<2), and may include the SiOx (x=0) in an amount of 70 parts by weight or more on the basis of 100 parts by weight of the silicon-containing active material.

In another exemplary embodiment, SiOx (x=0) may be included in amount of 70 parts by weight or more, preferably 80 parts by weight or more, and more preferably 90 parts by weight or more, and 100 parts by weight or less, preferably 99 parts by weight or less, and more preferably 95 parts by weight or less on the basis of 100 parts by weight of the silicon-containing active material.

In an exemplary embodiment of the present application, the silicon-containing active material may particularly use pure silicon (Si) as the silicon-containing active material. The use of pure silicon (Si) as the silicon-containing active material may mean that, on the basis of 100 parts by weight of the total silicon-containing active material as described above, pure Si particles (SiOx (x=0)) not bonded to other particles or elements are included within the above range.

In the charging and discharging reactions of the lithium secondary battery, lithium discharged from the positive electrode is intercalated into the negative electrode during charging, and is deintercalated from the negative electrode to return to the positive electrode again during discharging. In the case of the silicon-containing negative electrode active material, the volume change and the surface side reaction are severe, so that a large amount of lithium intercalated in the negative electrode during initial charging does not return to the positive electrode again, and thus an initial irreversible capacity increases. When the initial irreversible capacity increases, there occurs a problem that the battery capacity and the cycle are rapidly reduced.

In the present invention, in order to solve the above problems, the negative electrode of the lithium secondary battery is pre-lithiated to solve the initial irreversible capacity problem. Specifically, in the pre-lithiation process, during the lithium transfer process, lithium metal can be easily transferred from a transfer laminate and lithium in the negative electrode active material layer can also be uniformly pre-lithiated.

In addition, the present invention solves the problems of the related art in such a manner that while using only the silicon-containing active material as a negative electrode active material in order to improve the capacity performance, a composite of a binder of a specific condition and a conductive material bonded to the binder is used in order to address the problems of maintaining the conductive path and the combination of the conductive material, the binder, and the active material with respect to the volume expansion.

An average particle diameter (D50) of the silicon-containing active material of the present invention may be 5 μm to 10 μm, specifically 5.5 μm to 8 μm, and more specifically 6 μm to 7 μm. When the average particle diameter is within the above range, a specific surface area of the particles is within a suitable range, so that a viscosity of a negative electrode slurry is formed within an appropriate range. Accordingly, the particles constituting the negative electrode slurry are smoothly dispersed. In addition, when the size of the silicon-containing active material has a value equal to or greater than the lower limit value of the range, a contact area between the silicon particles and the conductive material is excellent due to the composite made of the conductive material and the binder in the negative electrode slurry, so that a sustaining possibility of the conductive network increases, thereby increasing the capacity retention rate. In the meantime, when the average particle diameter satisfies the above range, excessively large silicon particles are excluded, so that a surface of the negative electrode is formed smooth. Accordingly, a current density non-uniformity phenomenon during charging and discharging can be prevented.

In an exemplary embodiment of the present application, the silicon-containing active material generally has a characteristic BET surface area. The BET surface area of the silicon-containing active material is preferably 0.01 m²/g to 150.0 m²/g, more preferably 0.1 m²/g to 100.0 m²/g, particularly preferably 0.2 m²/g to 80.0 m²/g, and most preferably 0.2 m²/g to 18.0 m²/g. The BET surface area is measured in accordance with DIN 66131 (using nitrogen).

In an exemplary embodiment of the present application, the silicon-containing active material may be present, for example, in a crystalline or amorphous form, and is preferably not porous. The silicon particles are preferably spherical or splinter-shaped particles. Alternatively, but less preferably, the silicon particles may also have a fiber structure or be present in the form of a silicon-containing film or coating.

In an exemplary embodiment of the present application, the silicon-containing active material may be included in an amount of 60 parts by weight or more, on the basis of 100 parts by weight of the negative electrode active material layer composition.

In another exemplary embodiment the silicon-containing active material may be included in an amount of 60 parts by weight or more, preferably 65 parts by weight or more, and more preferably 70 parts by weight or more, and 95 parts by weight or less, preferably 90 parts by weight or less, and more preferably 80 parts by weight or less on the basis of 100 parts by weight of the negative electrode active material layer composition.

The negative electrode composition according to the present application uses the specific conductive material and binder capable of controlling the volume expansion rate during charging and discharging even when the silicon-containing active material having a significantly high capacity is used within the above range. Accordingly, even when the silicon-containing active material is within the above range, the negative electrode composition does not degrade the performance of the negative electrode and has excellent output characteristics in charging and discharging.

In an exemplary embodiment of the present application, the silicon-containing active material may have a non-spherical shape and its sphericity (circularity) is, for example, 0.9 or less, for example, 0.7 to 0.9, for example 0.8 to 0.9, and for example 0.85 to 0.9.

In the present application, the sphericity (circularity) is determined by Equation A-1, in which A is an area and P is a boundary line.

$$4\pi A/P^2 \qquad \text{[Equation A-1]}$$

In the related art, it is general to use only graphite-based compounds as the negative electrode active material. However, in recent years, as the demand for high-capacity batteries is increasing, attempts to mix and use silicon-containing compounds are increasing in order to increase capacity. However, the silicon-containing compounds have limitations in that the volume rapidly expands during the charging/discharging, resulting in damage to the conductive path formed in the negative electrode active material layer to degrade the performance of the battery. Therefore, a type of the negative electrode conductive material that is used together with the silicon-containing active material is important.

Accordingly, in an exemplary embodiment of the present application, the negative electrode conductive material may include one or more selected from the group consisting of a point-like conductive material, a linear conductive material, and a planar conductive material.

In an exemplary embodiment of the present application, the point-like conductive material refers to a conductive material that may be used so as to improve conductivity of the negative electrode and has conductivity without causing a chemical change. Specifically, the point-like conductive material may be at least one species selected from the group consisting of natural graphite, artificial graphite, carbon black, acetylene black, Ketjen black, channel black, furnace black, lamp black, thermal black, conductive fiber, fluorocarbon, aluminum powder, nickel powder, zinc oxide, potassium titanate, titanium oxide, and a polyphenylene derivative, and preferably may include carbon black in terms of high conductivity and excellent dispersibility.

In an exemplary embodiment of the present application, the point-like conductive material may have a BET specific surface area of 40 m²/g or greater and 70 m²/g or less, preferably 45 m²/g or greater and 65 m²/g or less, and more preferably 50 m²/g or greater and 60 m²/g or less.

In an exemplary embodiment of the present application, a particle diameter of the point-like conductive material may be 10 nm to 100 nm, preferably 20 nm to 90 nm, and more preferably 40 nm to 60 nm.

In an exemplary embodiment of the present application, the negative electrode conductive material may include a planar conductive material.

The planar conductive material can serve to improve conductivity by increasing surface contact among silicon particles in the negative electrode, and at the same time, to suppress the disconnection of the conductive path due to the volume expansion, and is used as a concept including as a bulk-type conductive material or a plate-like conductive material.

In an exemplary embodiment of the present application, the planar conductive material may include at least one selected from the group consisting of plate-like graphite, graphene, graphene oxide, and graphite flakes, and preferably may be plate-like graphite.

In an exemplary embodiment of the present application, the average particle diameter (D50) of the planar conductive material may be 2 μm to 7 μm, specifically 3 μm to 6 μm, and more specifically 4 μm to 5 μm. When the above range is satisfied, the sufficient particle size results in easy dispersion without causing an excessive increase in viscosity of the negative electrode slurry. Therefore, the dispersion effect is excellent when dispersing using the same equipment and time.

In an exemplary embodiment of the present application, there is provided a negative electrode active material layer composition in which the planar conductive material has D10 of 0.5 μm or greater and 1.5 μm or less, D50 of 2.5 μm or greater and 3.5 μm or less and D90 of 7.0 μm or greater and 15.0 μm or less.

In an exemplary embodiment of the present application, for the planar conductive material, a planar conductive material with a high specific surface area having a high BET specific surface area or a planar conductive material with a low specific surface area may be used.

In an exemplary embodiment of the present application, for the planar conductive material, a planar conductive material with a high specific surface area or a planar conductive material with a low specific surface area may be used without limitation. However, in particular, the planar conductive material according to the present application can be affected to some extent in the electrode performance by the dispersion effect, so that a planar conductive material with a low specific surface area that does not cause a problem in dispersion is used particularly preferably.

In an exemplary embodiment of the present application, the planar conductive material may have a BET specific surface area of 5 m$^2$/g or greater.

In another exemplary embodiment, the planar conductive material may have a BET specific surface area of 5 m$^2$/g or greater and 500 m$^2$/g or less, preferably 5 m$^2$/g or greater and 300 m$^2$/g or less, and more preferably 5 m$^2$/g or greater and 300 m$^2$/g or less.

In another exemplary embodiment, the planar conductive material is a planar conductive material with a high specific surface area, and the BET specific surface area may satisfy a range of 50 m$^2$/g or greater and 500 m$^2$/g or less, preferably 80 m$^2$/g or greater and 300 m$^2$/g or less, and more preferably 100 m$^2$/g or greater and 300 m$^2$/g or less.

In another exemplary embodiment, the planar conductive material is a planar conductive material with a low specific surface area, and the BET specific surface area may satisfy a range of 5 m$^2$/g or greater and 40 m$^2$/g or less, preferably 5 m$^2$/g or greater and 30 m$^2$/g or less, and more preferably 5 m$^2$/g or greater and 25 m$^2$/g or less.

Other negative electrode conductive materials may include linear conductive materials such as carbon nanotubes. The carbon nanotubes may be bundle-type carbon nanotubes. The bundle-type carbon nanotubes may include a plurality of carbon nanotube units. Specifically, the term 'bundle type' herein refers to, unless otherwise specified, a bundle or rope-shaped secondary shape in which a plurality of carbon nanotube units are aligned side by side in such an orientation that longitudinal axes of the carbon nanotube units are substantially the same, or are entangled. The carbon nanotube unit has a graphite sheet having a cylindrical shape with a nano-sized diameter, and has an sp2 bonding structure. In this case, the characteristics of a conductor or a semiconductor may be exhibited depending on the rolled angle and structure of the graphite sheet. As compared with entangled-type carbon nanotubes, the bundle-type carbon nanotubes can be more uniformly dispersed during the manufacture of the negative electrode, and can form more smoothly a conductive network in the negative electrode to improve the conductivity of the negative electrode.

In an exemplary embodiment of the present application, the negative electrode conductive material may be included in an amount of 10 parts by weight or more and 40 parts by weight or less, on the basis of 100 parts by weight of the negative electrode active material layer composition.

In another exemplary embodiment, the negative electrode conductive material may be included in an amount of 10 parts by weight or more and 40 parts by weight or less, preferably 10 parts by weight or more and 30 parts by weight or less, and more preferably 15 parts by weight or more and 25 parts by weight or less, on the basis of 100 parts by weight of the negative electrode active material layer composition.

The negative electrode conductive material according to the present application has a completely different configuration from a conductive material that is applied to the positive electrode. That is, the negative electrode conductive material according to the present application serves to hold the contact between silicon-containing active materials whose volume expansion of the electrode is very large due to charging and discharging, and the positive electrode conductive material serves to impart some conductivity while serving as a buffer when roll-pressed, and is completely different from the negative electrode conductive material of the present invention in terms of configuration and role.

In addition, the negative electrode conductive material according to the present application is applied to a silicon-containing active material, and has a completely different configuration from that of a conductive material that is applied to a graphite-based active material. That is, since a conductive material that is used for an electrode having a graphite-based active material simply has smaller particles than the active material, the conductive material has characteristics of improving output characteristics and imparting some conductivity, and is completely different from the negative electrode conductive material that is applied together with the silicon-containing active material as in the present invention, in terms of configuration and role.

In an exemplary embodiment of the present application, the planar conductive material that is used as the negative electrode conductive material described above has a different structure and role from those of the carbon-containing active material that is generally used as the negative electrode active material. Specifically, the carbon-containing active material that is used as the negative electrode active material may be artificial graphite or natural graphite, and refers to a material that is processed and used into a spherical or point-like shape so as to facilitate storage and release of lithium ions.

On the other hand, the planar conductive material that is used as the negative electrode conductive material is a material having a plane or plate shape, and may be expressed as plate-like graphite. That is, the planar conductive material is a material that is included so as to maintain a conductive path in the negative electrode active material layer, and means a material for securing a conductive path in a planar shape inside the negative electrode active material layer, rather than playing a role in storing and releasing lithium.

That is, in the present application, the use of plate-like graphite as a conductive material means that graphite is processed into a planar or plate-like shape and used as a material for securing a conductive path rather than playing a role in storing or releasing lithium. In this case, the negative electrode active material included together has high capacity characteristics with respect to storing and releasing lithium, and serves to store and release all lithium ions transferred from the positive electrode.

On the other hand, in the present application, the use of a carbon-containing active material as an active material means that the carbon-containing active material is processed into a point or spherical shape and used as a material for storing or releasing lithium.

That is, in an exemplary embodiment of the present application, artificial graphite or natural graphite, which is a carbon-containing active material, may have a BET specific surface area that satisfies a range of 0.1 $m^2$/g or greater and 4.5 $m^2$/g or less. In addition, plate-like graphite, which is a planar conductive material, has a planar shape, and a BET specific surface area thereof may be 5 $m^2$/g or greater.

In an exemplary embodiment of the present application, the negative electrode binder may include at least one selected from the group consisting of polyvinylidenefluoride-hexafluoropropylene copolymer (PVDF-co-HFP), polyvinylidenefluoride, polyacrylonitrile, polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer (EPDM), sulfonated EPDM, styrene butadiene rubber (SBR), fluoro rubber, poly acrylic acid, and the above-mentioned materials in which a hydrogen is substituted with Li, Na, Ca, etc., and may also include various copolymers thereof.

The binder according to the exemplary embodiment of the present application serves to hold the negative electrode active material and the negative electrode conductive material in order to prevent distortion and structural deformation of the negative electrode structure in volume expansion and relaxation of the silicon-containing active material. When such roles are satisfied, all of the general negative electrode binders can be applied. Specifically, a water-based binder may be used, and more specifically, a PAM-based binder may be used.

In an exemplary embodiment of the present application, the negative electrode binder may be included in an amount of 30 parts by weight or less, preferably 25 parts by weight or less, more preferably 20 parts by weight or less, and 5 parts by weight or more, and 10 parts by weight or more, on the basis of 100 parts by weight of the negative electrode active material layer composition.

In an exemplary embodiment of the present application, the pre-lithiation method of a negative electrode for a lithium secondary battery may include a step of transferring lithium metal onto the negative electrode active material layer.

In general, the pre-lithiation process chemically or physically pre-lithiates lithium metal on the negative electrode, and may be specifically carried out by a lithium metal transfer process, lithium metal powder deposition, an electrochemical process, or a lithium metal deposition process, and the pre-lithiation process according to the present application may include a lithium metal transfer process.

The lithium metal transfer process can transfer highly reactive lithium metal to the top of the negative electrode active material layer more stably. In this case, a process for easily transferring lithium metal from the transfer laminate on top of the negative electrode active material layer is required. Regarding this, according to the pre-lithiation method of the present application, the release layer is formed to improve transferability.

In an exemplary embodiment of the present application, the step of transferring the lithium metal may include steps of pretreating one surface of a base layer in a form of a pattern, forming a transfer laminate by sequentially laminating a release layer and a lithium metal on top of the pretreated one surface of the base layer, laminating the transfer laminate on the negative electrode active material layer such that a surface of the lithium metal opposite to a surface in contact with the release layer comes into contact with a surface of the negative electrode active material layer opposite to a surface in contact with the negative electrode current collector layer, and removing the base layer.

In an exemplary embodiment of the present application, the step of transferring the lithium metal includes a step of pretreating one surface of the base layer in a form of a pattern.

In an exemplary embodiment of the present application, the form of a pattern is not limited and can be used without limitation depending on a desired size of lithium metal, such as a mesh pattern and a honeycomb pattern. Through the pretreating step as described above, the adhesive force between the base layer and the release layer is improved, and accordingly, the release layer and lithium metal in a part subjected to the pretreatment are not transferred on top of the negative electrode active material layer, and the release layer and lithium metal layer in a part not subjected to the pretreatment can be transferred on top of the negative electrode active material layer.

That is, in the case in which an etching or patterning process of lithium is performed separately for patterning of lithium metal after the transfer process, problems such as fire and explosion may occur due to the very high reactivity of lithium. However, as described above, the pre-lithiation method of a negative electrode for a lithium secondary battery according to the present application can pattern and transfer the lithium metal by increasing the releasing force through the corona or plasma pretreatment of the base layer in the form of a pattern in advance.

In this case, there is provided the pre-lithiation method of a negative electrode for a lithium secondary battery in which the pretreating step includes a step of performing corona or plasma treatment, and with respect to a surface where the base layer and the release layer are in contact, an adhesive force of the pretreated surface is 4B or greater in a cross-cut evaluation standard, and an adhesive force of the not-pretreated surface is 1B or lower in the cross-cut evaluation standard.

The adhesive force can be measured by preparing a transfer laminate in which a base layer, a release layer, and a lithium metal layer are sequentially laminated, and conducting a cross-cut test according to ASTM3359, and specifically, can be measured under conditions of 5B (0% peeling), 4B (less than 5% peeling), 3B (5% to 15% peeling) 2B (15% to 35% peeling), 1B (35% to 65% peeling) and 0B (65% or more peeling).

In an exemplary embodiment of the present application, in the plasma treatment, plasma can be generated by a combination of nitrogen (N$_2$), air, argon (Ar), and oxygen gas (O$_2$), and specifically, plasma, which is ionized gas, can be generated by injecting oxygen-including gas into a facility and applying power. For example, when a voltage of 300 kW is applied while injecting N$_2$ 300 LPM (liter per minute) and Air 10 LPM together, plasma is generated in the plasma facility, and the base layer can be patterned and plasma-treated while causing the base layer to pass through the plasma.

In an exemplary embodiment of the present application, with respect to the surface where the base layer and the release layer are in contact, the adhesive force of the pretreated surface may be 200 gf/inch or higher, and preferably 250 gf/inch or higher.

In an exemplary embodiment of the present application, with respect to the surface where the base layer and the release layer are in contact, the adhesive force of the not-pretreated surface may be 100 gf/inch or lower, and preferably 80 gf/inch or lower.

In the pre-lithiation method of a negative electrode for a lithium secondary battery according to the present application, the lithium metal can be patterned and transferred on top of the negative electrode active material layer through the pretreatment process of the base layer as described above. As a result, in the process of cutting the negative electrode for a desired purpose, problems such as fire do not occur, and a negative electrode pre-lithiated to a desired degree can be acquired.

In an exemplary embodiment of the present application, the deposition method for depositing the lithium metal to the base layer may be selected from evaporation deposition, chemical vapor deposition (CVD) and physical vapor deposition, but is not limited thereto, and various deposition methods that are used in the art may be used.

In this case, a lamination process may be performed by roll pressing the electrode for a lithium secondary battery on which the transfer laminate is laminated by applying a load of 5 kgf/cm$^2$ to 500 kgf/cm$^2$. Thereafter, a process of removing the base layer is included, and during removal, the release layer and lithium metal laminated on the pretreated base layer may be removed together.

In addition, while solving the problem of reverse transfer as described above, the release layer is transferred to the negative electrode together to prevent exposure of the highly reactive lithium metal to the atmosphere, resulting in functioning as both an atmospheric barrier and a protective layer.

In an exemplary embodiment of the present application, any base layer can be used without limitation as long as it has features capable of withstanding process conditions such as high temperature in the step of depositing the lithium metal, and preventing a reverse peeling problem that lithium metal is transferred onto the base layer during a winding process for transferring the deposited lithium metal.

Specifically, in an exemplary embodiment of the present application, the base layer may be one or more selected from the group consisting of polyethylene terephthalate (PET), polyimide (PI), poly(methylmethacrylate) (PMMA), polypropylene, polyethylene and polycarbonate.

In an exemplary embodiment of the present application, a thickness of the base layer may be 1 μm or greater and 300 μm or less, and may satisfy a range of 5 μm or greater and 200 μm or less, and 10 μm or greater and 100 μm or less.

In an exemplary embodiment of the present application, a thickness of the lithium metal may be 1 μm or greater and 10 μm or less, and preferably may satisfy a range of 3 μm or greater and 10 μm or less.

When the thicknesses of the base layer and the lithium metal satisfy the above range, the transfer of the lithium metal to the negative electrode active material layer can occur efficiently and the reverse transfer can be prevented.

In an exemplary embodiment of the present application, there is provided the pre-lithiation method of a negative electrode for a lithium secondary battery in which the release layer is further included on a surface in contact with the base layer and the lithium metal of the transfer laminate, in order to improve peelability of the lithium metal, to secure transferability to the negative electrode active material layer and to serve as a protective layer after transfer of the lithium metal.

That is, the base layer may have a release layer formed on at least one surface, or may have release layers formed on both surfaces. The release layer makes it possible to prevent a reverse peeling problem that lithium metal is transferred onto the base layer during a winding process for transferring deposited lithium metal to the negative electrode, and also makes it possible to easily separate the base layer after transferring lithium metal onto the negative electrode active material layer.

There is provided the pre-lithiation method of a negative electrode for a lithium secondary battery in which the release layer includes one or more species selected from the group consisting of silicon-modified polyester in which a silicon chain is graft-linked to a polyester main chain, an acrylic resin, Si, melamine, and fluorine.

In an exemplary embodiment of the present application, the release layer may be formed by a coating method. For example, the coating method may be a method selected from the group consisting of dip coating, spray coating, spin coating, die coating, gravure coating, micro-gravure coating, comma coating, and roll coating, but is not limited thereto. That is, various coating methods that can be used to form a coating layer in the art can be used.

In an exemplary embodiment of the present application, a pre-lithiation process may proceed from the step of laminating and transferring the lithium metal onto the negative electrode active material layer, which may be referred to as a pre-lithiation reaction due to the high reactivity of the lithium metal before an activation process.

In an exemplary embodiment of the present application, a step of activating the transferred lithium metal may be included.

There is provided the pre-lithiation method of a negative electrode for a lithium secondary battery in which in the step of activating the lithium metal, an activation reaction occurs within 30 minutes to 3 hours under conditions of 25° C. and 1 atm.

The activating step is a step of setting a condition for diffusing lithium metal into the negative electrode active material layer, and whether the pre-lithiation is completed can be determined depending on whether lithium on top of the metal layer has completely disappeared.

In an exemplary embodiment of the present application, the activation reaction time may be 30 minutes to 3 hours, and preferably 1 hour to 2 hours.

In an exemplary embodiment of the present application, there is provided the pre-lithiation method of a negative electrode for a lithium secondary battery in which a width of the release layer satisfies Equation 2 below, $$X < \text{width of release layer} < Y \qquad \text{[Equation 2]}$$

In Equation 2, X refers to a width of the lithium metal, and Y refers to a width of the negative electrode current collector layer.

The pre-lithiation method of a negative electrode according to the present application may be characterized in that the lithium metal patterned as described above can be transferred and Equation 2 above is additionally satisfied.

According to the pre-lithiation method of a negative electrode for a lithium secondary battery according to an exemplary embodiment of the present invention, the transfer process of lithium metal is used, and specifically, the width of the transferred lithium metal is smaller than the width of the release layer transferred together, so that the base layer of the transfer laminate can be easily removed in the transferring of the lithium metal. That is, the problems relating to transferability, such as reverse transfer in the transfer process of lithium metal of the related art, are addressed by adjusting the physical widths, as described above.

In addition, the width of the transferred lithium metal is smaller than the width of the release layer transferred together, and the release layer is transferred to the negative electrode together to prevent exposure of the highly reactive lithium metal to the atmosphere, resulting in functioning as both an atmospheric barrier and a protective layer.

In an exemplary embodiment of the present application, the width of the above-described release layer, the width of the lithium metal, the width of the negative electrode active material layer, and the width of the negative electrode current collector layer may each refer to a width in a direction (TD, transverse direction) perpendicular to a traveling direction (MD, machine Direction) of the R2R process. Specifically, each width may refer to a width in a direction perpendicular to a direction in which the R2R process proceeds.

Specifically, in FIG. 1, the range of Equation 2 can be confirmed, and it can also be seen that the width of the release layer 35 is formed larger than the width of the lithium metal 20, and accordingly, during transfer of lithium metal, the base layer of the transfer laminate can be easily removed. That is, the problems relating to transferability, such as reverse transfer in the transfer process of lithium metal of the related art, can be addressed by adjusting the physical widths, as described above.

An exemplary embodiment of the present application provides a negative electrode intermediate including: a negative electrode current collector layer; a negative electrode active material layer formed on one surface or both surfaces of the negative electrode current collector layer; and a transfer laminate formed on a surface of the negative electrode active material layer opposite to a surface in contact with the negative electrode current collector layer, in which the transfer laminate has a structure in which a base layer, a release layer, and a lithium metal are sequentially laminated, in which one surface of the base layer in contact with the release layer includes a pattern-shaped pretreated part, and in which the lithium metal and the negative electrode active material layer satisfy Equation 1 below, $$X \leq X1 \qquad \text{[Equation 1]}$$

in Equation 1,

X refers to a width of the lithium metal, and

X1 refers to a width of the negative electrode active material layer.

An exemplary embodiment of the present application provides a lithium secondary battery including: a positive electrode for the lithium secondary battery; a negative electrode for the lithium secondary battery pre-lithiated according to the method of the present application; a separator provided between the positive electrode and the negative electrode; and an electrolyte solution.

FIG. 3 shows a laminated structure of a lithium secondary battery according to an exemplary embodiment of the present application. Specifically, a negative electrode 200 for a lithium secondary battery including a negative electrode active material layer 30 on one surface of a negative electrode current collector layer 40 can be seen. In this case, a width of the negative electrode current collector layer 40 may be larger than a width of the negative electrode active material layer 30, but this is not shown in FIG. 3. Specifically, a positive electrode 300 for a lithium secondary battery including a positive electrode active material layer 70 on one surface of a positive electrode current collector layer 60 can be seen, and the negative electrode 200 for a lithium secondary battery and the positive electrode 300 for a lithium secondary battery are formed in a laminated structure with a separator 50 interposed therebetween.

In this case, the release layer 35 used during pre-lithiation can be all removed depending on the electrolyte solution used, and accordingly, does not remain on top of the negative electrode, thereby preventing an unnecessary increase in resistance. That is, the release layer improves transferability, can be used to protect lithium metal before pre-lithiation, and can be removed after injection of the electrolyte solution.

In an exemplary embodiment of the present application, the electrolyte solution may include an organic liquid electrolyte solution, an inorganic liquid electrolyte, a solid polymer electrolyte, a gel-type polymer electrolyte solution, a solid inorganic electrolyte solution, or a molten-type inorganic electrolyte solution that may be used in the manufacturing of the lithium secondary battery, but is not limited thereto.

Specifically, the electrolyte solution may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimetoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivative, sulfolane, methyl sulfolane, 1,3-dimethyl-2-imidazolidinone, propylene carbonate derivative, tetrahydrofuran derivative, ether, methyl propionate, or ethyl propionate may be used.

In particular, among the carbonate-based organic solvents, ethylene carbonate and propylene carbonate, which are cyclic carbonates, are high-viscosity organic solvents and can be preferably used because they have high permittivity to dissociate a lithium salt well. When the cyclic carbonate is mixed with a linear carbonate with low viscosity and low permittivity, such as dimethyl carbonate or diethyl carbonate, in a suitable ratio and used, an electrolyte having high electric conductivity may be prepared, and therefore, may be more preferably used.

A lithium salt may be used as the metal salt, and the lithium salt is a material that is readily soluble in the non-aqueous electrolyte solution, in which, for example, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF3CF2(CF3)$ $2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$ may be used as an anion of the lithium salt.

One or more additives, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte solution for the purpose of improving lifetime characteristics of the battery, suppressing a decrease in battery capacity, improving discharge capacity of the battery, and the like, in addition to the above-described electrolyte solution components.

An exemplary embodiment of the present invention provides a battery module including the lithium secondary battery as a unit cell, and a battery pack including the same. Since the battery module and the battery pack include the secondary battery having high capacity, high rate capability, and high cycle characteristics, the battery module and the battery pack may be used as a power source of a medium to large sized device selected from the group consisting of an electric vehicle, a hybrid electric vehicle, a plug-in hybrid electric vehicle, and a power storage system.

Below, preferred examples will be provided for better understanding of the present invention. It will be apparent to one skilled in the art that the examples are only provided to illustrate the present invention and various modifications and alterations are possible within the scope and technical spirit of the present invention. Such modifications and alterations naturally fall within the scope of claims included herein.

Example 1

<Manufacture of Transfer Laminate>

A polyethylene terephthalate base layer was prepared. Thereafter, a voltage of 15 kV was applied to a plasma generating unit, and $N_2$ (800 slm) and CDA (5 slm) were caused to flow for generation of plasma, and the base layer was caused to pass through the plasma at a rate of 5 lpm to pattern and plasma-treat a surface of the base layer.

Thereafter, a laminate (available from i-One Film Co., Ltd.) coated with an acrylic resin in a level of 1 μm as a release layer was laminated on top of the base layer. Lithium metal was deposited on the release layer of the laminate to form a lithium metal layer having a thickness of 6 μm by thermal evaporation, thereby preparing a transfer laminate. In this case, EWK-050 available from ULVAC, Inc. was used as the deposition apparatus, and the deposition process was performed under conditions of the speed of 2.5 m/min, the temperature of the lithium supply unit of 500° C., and the temperature of the main roll of −25° C.

In this case, during the cross-cut tape test of the plasma treated surface and the release layer, it could be confirmed that the adhesive force of 5B level (200 gf/inch or higher) was shown, and during the cross-cut tape test of the plasma untreated surface and the release layer, it could be confirmed that the adhesive force of 0B level (100 gf/inch or lower) was shown.

<Manufacture of Negative Electrode>

Si (average particle diameter (D50): 3.5 μm) serving as a silicon-containing active material, Denka black serving as a conductive material, SBR serving as a binder, and CMC serving as a thickener were added to distilled water serving as a solvent for forming a negative electrode slurry in a weight ratio of 80:15.8:3:1.2 to manufacture a negative electrode slurry (solid content concentration: 25 wt. %).

As a mixing method, the conductive material, the binder, the thickener, and water were dispersed at 2500 rpm for 30 minutes by using a homo mixer, and then the active material was added and dispersed therein at 2500 rpm for 30 minutes to manufacture a slurry.

The negative electrode slurry was coated on both surfaces of a copper current collector (thickness: 8 μm) serving as a negative electrode current collector with a loading amount of 85 mg/25 cm², roll-pressed, and dried in a vacuum oven at 130° C. for 10 hours to form a negative electrode active material layer (thickness: 33 μm), which was prepared as a negative electrode (thickness of negative electrode: 41 μm, porosity of negative electrode: 40.0%).

Then, in order to transfer the transfer laminate to the negative electrode active material layer, the lithium metal of the transfer laminate was placed on top of the negative electrode active material layer, which was then subjected to roll-pressing while applying a load of 200 kgf/cm². In this case, the temperature was set to 80° C., and the PET layer of the transfer laminate was removed immediately after lamination, and the negative electrode was subjected to pre-lithiation.

Thereafter, the negative electrode was cut along the patterned line to obtain a target negative electrode.

In this case, the width (X) of the lithium metal was 20 mm, the width (X1) of the negative electrode active material layer was 20 mm, the width of the release layer was 30 mm, and the width (Y) of the negative electrode current collector layer was 40 mm.

FIG. 4 shows a transfer laminate according to Example 1 of the present application. Specifically, it could be confirmed that, after the transfer process, the lithium metal and the release layer on the plasma untreated surface were transferred on top of the negative electrode active material layer, and the lithium metal on the plasma treated surface remained as it was.

FIG. 7 shows a transfer result of lithium metal on top of the negative electrode according to Example 1 of the present application. As can be seen in FIG. 7, it could be confirmed that the range of Equation 1 of the present application was satisfied, and therefore, lithium at the edge portion was not separated together, so that it was excellent in terms of safety in the subsequent process.

Example 2

The negative electrode was manufactured in the same manner as Example 1, except that, with respect to the manufacture of Example 2, the width (X) of the lithium metal was 20 mm, the width (X1) of the negative electrode active material layer was 25 mm, the width of the release layer was 30 mm, and the width (Y) of the negative electrode current collector layer was 40 mm.

Example 3

The negative electrode was manufactured in the same manner as Example 1, except that, with respect to the manufacture of Example 3, the width (X) of the lithium metal was 20 mm, the width (X1) of the negative electrode active material layer was 20 mm, the width of the release layer was 20 mm, and the width (Y) of the negative electrode current collector layer was 20 mm.

As can be confirmed from the results of Examples 1 to 3, in the pre-lithiation process of a negative electrode for a lithium secondary battery according to the present application, the surface of the base layer in contact with the release layer was pretreated in a form of a pattern (corona or plasma treatment), so that the transferability of the base layer could be controlled. As a result, the releasing force of the surface subjected to the corona or plasma treatment in a form of a pattern was lowered, so that the lithium metal could be patterned and transferred into a desired shape. In addition, in the cases of Examples 1 to 3, it could be confirmed that the range of Equation 1 was satisfied, and therefore, the stability of the process was improved.

When the base layer is pretreated in a desired pattern as described above, the adhesive force between the pretreated surface and the release layer is increased. Therefore, when the base layer is removed, the release layer and the lithium metal are removed together, so that lithium metal can be transferred in a desired capacity and size on top of the negative electrode active material layer. As a result, it could be confirmed that a negative electrode having a desired use and capacity could be manufactured by cutting a portion later where lithium metal is not transferred.

Further, according to the pre-lithiation method of a negative electrode for a lithium secondary battery according to the exemplary embodiment of the present invention, the transfer process of lithium metal is used, and specifically, the width of the transferred lithium metal is smaller than the width of the release layer transferred together, so that the base layer of the transfer laminate can be easily removed during the transferring of the lithium metal. In addition, the width of the transferred lithium metal is smaller than the width of the release layer transferred together, and the release layer is transferred to the negative electrode together to prevent exposure of the highly reactive lithium metal to the atmosphere, resulting in functioning as both an atmospheric barrier and a protective layer. These could be confirmed by comparing Example 1 and Example 3.

Comparative Example 1

<Manufacture of Transfer Laminate>

A polyethylene terephthalate base layer was prepared. After that, a voltage of 15 kV was applied to a plasma generating unit, and N2 (800 slm) and CDA (5 slm) were caused to flow for generation of plasma, and the base layer was caused to pass through the plasma at a rate of 5 lpm to plasma-treat an entire surface of the base layer.

Thereafter, a laminate (available from i-One Film Co., Ltd.) coated with an acrylic resin in a level of 1 μm as a release layer was laminated on top of the base layer. Lithium metal was deposited on the release layer of the laminate to form a lithium metal layer having a thickness of 6 μm by thermal evaporation, thereby preparing a transfer laminate. In this case, EWK-050 available from ULVAC, Inc. was used as the deposition apparatus, and the deposition process was performed under conditions of the speed of 2.5 m/min, the temperature of the lithium supply unit of 500° C., and the temperature of the main roll of –25° C.

In this case, it was confirmed that the adhesive force of 5B level (200 gf/inch or higher) was shown during a cross-cut tape test of the plasma-treated surface and the release layer.

<Manufacture of Negative Electrode>

Si (average particle diameter (D50): 3.5 μm) serving as a silicon-containing active material, Denka black serving as a conductive material, SBR serving as a binder, and CMC serving as a thickener were added to distilled water serving as a solvent for forming a negative electrode slurry in a weight ratio of 80:15.8:3:1.2 to manufacture a negative electrode slurry (solid content concentration: 25 wt. %).

As a mixing method, the conductive material, the binder, the thickener, and water were dispersed at 2500 rpm for 30 minutes by using a homo mixer, and then the active material was added and dispersed therein at 2500 rpm for 30 minutes to manufacture a slurry.

The negative electrode slurry was coated on both surfaces of a copper current collector (thickness: 8 μm) serving as a negative electrode current collector with a loading amount of 85 mg/25 cm$^2$, roll-pressed, and dried in a vacuum oven at 130° C. for 10 hours to form a negative electrode active material layer (thickness: 33 μm), which was prepared as a negative electrode (thickness of negative electrode: 41 μm, porosity of negative electrode: 40.0%).

Then, in order to transfer the transfer laminate to the negative electrode active material layer, the lithium metal of the transfer laminate was placed on top of the negative electrode active material layer, which was then subjected to roll-pressing while applying a load of 200 kgf/cm$^2$. In this case, the temperature was set to 80° C., and the PET layer of the transfer laminate was removed immediately after lamination, but the adhesive force between the release layer and the base layer was strong, so that lithium metal was not transferred to the negative electrode active material layer, and therefore, pre-lithiation did not proceed smoothly.

FIG. 5 shows a transfer laminate according to Comparative Example 1 of the present application. Specifically, it could be confirmed that the entire surface of the base layer was plasma-treated, so the lithium metal remained as it was and thus the lithium metal was not transferred on top of the negative electrode active material layer.

Comparative Example 2

<Manufacture of Transfer Laminate>

A laminate (available from i-One Film Co., Ltd.) coated with an acrylic resin in a level of 1 μm as a release layer on a polyethylene terephthalate base layer was prepared. Lithium metal was deposited on the release layer of the laminate to form a lithium metal layer having a thickness of 6 μm by thermal evaporation, thereby preparing a transfer laminate. In this case, EWK-050 available from ULVAC, Inc. was used as the deposition apparatus, and the deposition process was performed under conditions of the speed of 2.5 m/min, the temperature of the lithium supply unit of 500° C., and the temperature of the main roll of –25° C.

<Manufacture of Negative Electrode>

Si (average particle diameter (D50): 3.5 μm) serving as a silicon-containing active material, Denka black serving as a conductive material, SBR serving as a binder, and CMC serving as a thickener were added to distilled water serving as a solvent for forming a negative electrode slurry in a weight ratio of 80:15.8:3:1.2 to manufacture a negative electrode slurry (solid content concentration: 25 wt. %).

As a mixing method, the conductive material, the binder, the thickener, and water were dispersed at 2500 rpm for 30 minutes by using a homo mixer, and then the active material was added and dispersed therein at 2500 rpm for 30 minutes to manufacture a slurry.

The negative electrode slurry was coated on both surfaces of a copper current collector (thickness: 8 μm) serving as a negative electrode current collector with a loading amount of 85 mg/25 cm², roll-pressed, and dried in a vacuum oven at 130° C. for 10 hours to form a negative electrode active material layer (thickness: 33 μm), which was prepared as a negative electrode (thickness of negative electrode: 41 μm, porosity of negative electrode: 40.0%).

Then, in order to transfer the transfer laminate to the negative electrode active material layer, the lithium metal of the transfer laminate was placed on top of the negative electrode active material layer, which was then subjected to roll-pressing while applying a load of 200 kgf/cm². In this case, the temperature was set to 80° C., and the PET layer of the transfer laminate was removed immediately after lamination, and the negative electrode was subjected to pre-lithiation.

Although the negative electrode was pre-lithiated according to Comparative Example 2, the entire surface of the wide negative electrode was pre-lithiated with lithium metal, so that the process of cutting the negative electrode into a target size could not be performed.

Comparative Example 3

The negative electrode was manufactured in the same manner as Example 1, except that, in the manufacture of Comparative Example 3, the width (X) of the lithium metal was 25 mm, the width (X1) of the negative electrode active material layer was 20 mm, the width of the release layer was 25 mm, and the width (Y) of the negative electrode current collector layer was 20 mm.

Comparative Example 3 corresponds to a case in which the width (X) of the lithium metal is formed greater than the width (X1) of the negative electrode active material layer, and therefore, the range of Equation 1 according to the present application is not satisfied. In this case, after lithium metal is transferred, lithium metal in a region larger than the negative electrode active material layer comes off together and adheres to the negative electrode active material layer, and a lithium residue separates and remains in a form of particles in an assembly process, which is a post-process, causing great danger in terms of stability. Specifically, FIG. 6 shows a transfer result of lithium metal on top of the negative electrode according to Comparative Example 3 of the present application. As can be seen in FIG. 6, it could be confirmed that the lithium at the edge portion was separated together and the residue was thereafter separated, and accordingly, it could be confirmed that there is a risk in terms of safety in the subsequent process.

The invention claimed is:

1. A pre-lithiation method of a negative electrode for a lithium secondary battery, the pre-lithiation method comprising:

forming a negative electrode active material layer on one surface or both surfaces of a negative electrode current collector layer; and transferring lithium metal onto the negative electrode active material layer, wherein the transferring of the lithium metal comprises:

providing a base layer and pretreating one surface of the base layer in a form of a pattern, forming a transfer laminate by sequentially laminating a release layer and a lithium metal on top of the pretreated one surface of the base layer, laminating the transfer laminate on the negative electrode active material layer such that a surface of the lithium metal opposite to a surface of the lithium metal in contact with the release layer comes into contact with a surface of the negative electrode active material layer opposite to a surface in contact with the negative electrode current collector layer, and removing the base layer, wherein the lithium metal and the negative electrode active material layer satisfy Equation 1 below, $$X \leq X1, \qquad \text{[Equation 1]}$$

in Equation 1,

X refers to a width of the lithium metal, and

X1 refers to a width of the negative electrode active material layer, and wherein a width of the release layer satisfies Equation 2 below, $$X < \text{width of release layer} < Y, \qquad \text{[Equation 2]}$$

in Equation 2, X refers to the width of the lithium metal, and Y refers to a width of the negative electrode current collector layer.

2. The pre-lithiation method of claim 1, wherein the pretreating comprises performing corona or plasma treatment, and wherein with respect to a surface where the base layer and the release layer are in contact, an adhesive force of the pretreated surface is 4B or greater in a cross-cut evaluation standard according to ASTM3359, and an adhesive force of the not-pretreated surface is 1B or lower in the cross-cut evaluation standard.

3. The pre-lithiation method of claim 1, wherein the forming of the negative electrode active material layer on one surface or both surfaces of the negative electrode current collector layer comprises coating a negative electrode slurry comprising a negative electrode active material layer composition on one surface or both surfaces of the negative electrode current collector layer, and wherein the negative electrode active material layer composition comprises one or more selected from the group consisting of a silicon-containing active material, a negative electrode conductive material, and a negative electrode binder.

4. The pre-lithiation method of claim 3, wherein the silicon-containing active material comprises one or more selected from the group consisting of SiOx (x=0), SiOx (0<x<2), SiC, and a Si alloy.

5. The pre-lithiation method of claim 3, wherein the silicon-containing active material comprises one or more selected from the group consisting of SiOx (x=0) and SiOx (0<x<2), and comprises the SiOx (x=0) in an amount of 70 parts by weight or more on a basis of 100 parts by weight of the silicon-containing active material.

6. The pre-lithiation method of claim 1, wherein a thickness of the lithium metal is 1 μm or greater and 10 μm or less.

7. The pre-lithiation method of claim 1, wherein the release layer comprises one or more selected from the group consisting of silicon-modified polyester in which a silicon chain is graft-linked to a polyester main chain, an acrylic resin, Si, melamine, and fluorine.

* * * * *